United States Patent
Holmes et al.

[19]

[11] Patent Number: 5,949,675
[45] Date of Patent: Sep. 7, 1999

[54] TRANSIENT-FREE GAIN SWITCHING WITHIN ERROR THRESHOLD

[75] Inventors: Thomas Joseph Holmes, Portola Valley; David L. Cielaszyk, Sunnyvale; David J. Wirthman, Mountain View, all of Calif.

[73] Assignee: Space Systems/Loral, Inc., Palo Alto, Calif.

[21] Appl. No.: 08/742,854

[22] Filed: Nov. 1, 1996

[51] Int. Cl.$^6$ .................................................. G05B 13/02
[52] U.S. Cl. ............... 364/157; 364/148.07; 364/148.09; 364/150; 364/151; 701/4; 701/5; 244/164; 244/171; 244/176
[58] Field of Search .................................... 364/150, 151, 364/152, 156, 157, 459, 158, 148.01–148.09; 244/164, 165, 171, 176; 342/352, 356, 357, 457, 458; 360/78.04, 78.05, 78.09, 78.12, 75; 701/4, 5, 13

[56] References Cited

U.S. PATENT DOCUMENTS

| | | | |
|---|---|---|---|
| 4,283,670 | 8/1981 | Durand | 318/591 |
| 4,752,884 | 6/1988 | Slafer et al. | 364/434 |
| 5,041,833 | 8/1991 | Weingberg | 342/458 |
| 5,252,900 | 10/1993 | Uehara et al. | 318/568.11 |
| 5,362,205 | 11/1994 | Turner | 416/34 |
| 5,452,869 | 9/1995 | Basuthakur et al. | 244/164 |
| 5,490,057 | 2/1996 | Vinciarelli et al. | 364/157 |
| 5,562,266 | 10/1996 | Achkar et al. | 244/171 |
| 5,587,896 | 12/1996 | Hansen et al. | 364/148 |
| 5,781,362 | 7/1998 | Bang | 360/78.05 |

FOREIGN PATENT DOCUMENTS

WO 93/02885  2/1993  WIPO.

Primary Examiner—William Grant
Assistant Examiner—Ramesh Patel
Attorney, Agent, or Firm—Perman & Green, LLP

[57] ABSTRACT

For a switching of a magnitude of system gain in the driving of a load by a control system, a method of inhibiting formation of switching transients has a step of distinguishing between an estimate of a plant state, such as the attitude of a spacecraft, and an integral control state which allows the control system to provide actuation in response to long term disturbances, such as solar pressure, in operation of the system. In the case of a feedback configuration to the system with controller in a forward branch and an estimator in a feedback branch, a loop error signal serves to drive an actuator of the load via the controller. The method includes a further step of evaluating a portion of a controller input signal which is exclusive of an integral control state and which comprises a difference between a desired state and an estimate of the plant state. The evaluation step enables observation of an occurrence of a magnitude of the difference which falls within a range of values satisfying a criteria of minimal effect on the actuator. There is a further step of switching a value of the gain during the occurrence. Also, concurrently with the switching step, there is a scaling of an amplitude of the integral state by a factor inverse to a ratio of switched gain values.

7 Claims, 3 Drawing Sheets

TRANSIENT-FREE GAIN SWITCHING WITHIN ERROR THRESHOLD

BACKGROUND OF THE INVENTION

This invention relates to a control system, such as a spacecraft attitude control system, having a choice of gains to be employed in a controller and in a compensator of the system and, more particularly, to a mode of switching between a high gain and a low gain without introduction of a significant transient.

Control systems attempt to control a plant, such as a spacecraft, submarine, chemical plant, or manufacturing equipment, by way of example, by outputting desired quantities, such as motor torques and thruster assignments with on times, in response to the sum of these quantities and disturbances on the plant. Herein, the plant of primary interest is a spacecraft and, accordingly, this presentation will be in terms of a spacecraft, it being understood that the concepts presented herein apply also to other plants. For example, in the case of a spacecraft employing an earth sensor to determine spacecraft attitude by observing the edges of the earth to provide an estimate of nadir, it is a practice to use thrusters and reaction wheels to reorient a spacecraft to maintain its attitude. Typically, a control system is configured as a feedback loop wherein a desired output is the spacecraft orientation and its rates. Typically, an estimator is employed to provide estimates of these quantities, these quantities being called the states of the spacecraft. An estimator is not required if direct, low noise measurements are available, or can be transformed into the direction of these states. Earth sensors and rate gyros are examples of sensors that can be used for direct measurements of the states of spacecraft orientation and rates. However, most spacecraft require pointing to higher accuracies than the earth sensor noise levels, thereby requiring some sort of filtering or estimation for the desired results. The difference between the desired set of states and the estimated (measured) set of states is known as the loop error signal.

Information obtained from the earth sensor, as well as from another type of sensor such as a star sensor, or an image recognition device for recognizing features of the earth, by way of example, often is applied to an estimator to filter out noise of the measurement to gain a higher precision of the measurement. The estimator may process the signal outputted by one of the foregoing sensors, or may process signals outputted by a plurality of such sensors to provide estimates of the states of the plant being controlled. These estimates, when differenced with a set of desired states, provide the control system with a set of feedback signals. Estimating may involve averaging, statistical analysis and/or Kalman filtering, by way of example. The estimator may be provided with a relatively high gain for faster response with increased noise power output, or may be provided with a lower gain for slower response. The lower gain results in a slower response and lower bandwidth providing state estimates with reduced noise. Similarly, a controller of an output quantity, such as a rotational rate of the spacecraft, may be provided with a higher gain for faster response with increased noise power output, or may be provided with a lower gain for slower response and reduced noise power output. In the case of a reaction wheel controller, the higher gain may be used during a thruster firing, while lower gains may be used during quiescent periods.

The disturbance function may be in the form of a disturbing torque produced, by way of example, by viscous friction of a lubricant on a reaction wheel or by the pressure of solar rays on a spacecraft. The disturbing torques can have a cumulative effect which require constant torque demands from the control system even after the loop error signal is driven to zero. In order to reduce hang off errors resulting from these demands, some control system designs employ integral control states to generate a non-zero controller input signal in order to maintain these constant torque demands from the control system.

Control systems can be implemented with analog or digital hardware. In the case of an analog implementation, estimates of the plant states are generated with RLC (resistive, inductive, capacitive) circuits. These circuits filter the sensor outputs, which typically would be voltage levels, to the desired voltage levels for the control system to utilize. These output voltages are differenced with desired voltage levels to provide error signal inputs to the control system to use additional RLC circuits to generate output voltages to be sent to the actuators. In the case of a digital implementation, sensor outputs would be converted to binary data for the onboard computer to utilize. These data would then be manipulated with algorithmic processing to provide estimates of the plant states. These estimates are differenced with desired states to provide error signal inputs to the control system to use additional algorithmic processing to generate outputs to be sent to the actuators. In either case, one of the estimates could be the plant state corresponding to the orientation of the spacecraft, another estimate could be the integral of the difference between this estimate and the desired orientation of the spacecraft, another could be the integral of the difference between this state and the desired position of the spacecraft, or the raw integral of a sensor that measures that difference, a third state could be an estimate of the rate of spacecraft. Differences between these estimates, whether voltage levels or binary data, and the desired states provide a composite error signal to generate outputs to control actuators for improved response of the plant.

One aspect of a control situation, particularly in the case of the orienting of a spacecraft, is the need to vary a gain of the control system. For example, a thruster would be employed to change the orientation of the spacecraft. In the case of the orienting of the spacecraft to correct a drifting away from a desired orientation, use may be made of reaction wheels. Maintaining a torque from the reaction wheels to the spacecraft to reject disturbance torques can cause the wheel speeds to increase beyond their safe operating speeds. A desired form of response of the momentum control system would be to activate a thruster to reduce the momentum of the spacecraft. This impulse would temporarily shift the orientation of the spacecraft. The wheel control system would respond by reducing the wheel speeds, thereby restoring the spacecraft's desired orientation. These examples are given in terms of a single axis of rotation, but it should be understood that, in the typical situation, orientation is to be adjusted about three axes of rotation employing a plurality of thrusters and a plurality of reaction wheels.

Furthermore, in the foregoing example, it may be desired to increase the gain of the compensator of the sensor signals to give a faster response to position signals obtained from one or more sensors. A slow response in the compensator would inhibit observation of a rapidly changing situation, such as a rapid change in spacecraft orientation. This would negate control of the spacecraft orientation in a situation of rapid change of orientation. Accordingly, control systems typically increase their gains when the plant being controlled enters a condition of increased disturbance, such as the reaction wheel control system responding to thruster firings.

A problem arises in that, upon a changing of gain in a control system, such as from a high gain to a low gain or from a low gain to a high gain, it has been found that an undesired transient develops in the plant response. This might be manifested by excessive overshoot in the spacecraft position, an inadequate speed of response, or inadequate precision due to noise outputted by the estimator.

SUMMARY OF THE INVENTION

The aforementioned problems are overcome and other advantages are provided by a procedure, in accordance with the invention, for operation of a control system, typically a feedback control system having a controller in a forward branch and an estimator in a feedback branch, to enable a switching of gain settings between relatively high and relatively low gain settings without introduction of a significant transient. In accordance with the invention, an informational signal based on data from one or more sensors provides a measure of the state of the plant and may be referred to hereinafter as a measurement signal. Such an informational signal, which can be obtained in an open-loop control system, serves as a feed back signal in a closed-loop control system.

By way of example, the output quantities of the control system may be torque requests to the reaction wheels, and the disturbance may be due to solar pressure on the spacecraft or bearing drag on a reaction wheel of the spacecraft. By way of further example, the error feedback signal may have three components which are used by the controller to provide signals to the actuators which impart control to the spacecraft, thereby providing the desired response. One of these signals could be the error between the desired spacecraft orientation angle and the estimated angle. Another could be the error between the desired spacecraft rate of change in the orientation angle, and the estimated rate of change. Another optional signal may be the integral control state consisting of the integral of the first error signal mentioned in this paragraph, or the integral of the sensor output that measures this error directly. Further this provides a description of one axis of control; typically, there are three axes of control for a spacecraft. This means a triplication of the aforementioned signals.

In the practice of the invention, it is recognized that for those control systems using integral control states, that the output signals to the actuators resulting from the integral control states which counteract the disturbances should remain constant during a switching of gain. Otherwise, the disturbance compensating component of the output signal would be shifted suddenly to some other value, different from an acceptable value which has been established prior to the gain switching. Such a sudden shift in the magnitude of the output signal would be unnecessary and, furthermore, would introduce a transient in the behavior of a load driven by the control system. In the foregoing example, wherein the load is the inertia of a spacecraft, the transient would be manifested as a transient in torques, with resultant transients in the rates of the orientation angles and the corresponding angles of the spacecraft.

Furthermore, it is recognized in the practice of the invention that a change of gain at a time wherein the error signal is essentially zero would have little immediate effect on the control output signal because zero magnitude multiplied by a nonzero gain provides a zero magnitude for the control output signal.

The foregoing aspects of the invention are implemented as follows. The control process of the plant controller is observed for determining a suitable threshold for amplitude of the loop error signal below which the loop error has no more than a negligible effect on a plant actuator response. Such an actuator may be, by way of example, the foregoing reaction wheel or the foregoing thruster. This enables a person to determine criteria for maximum range of angle error and a maximum range of angle rate in which gain switching can be accomplished with little immediate effect on an actuator. Subsequently, during operation of the control system, prior to implementing a gain switch, the loop error signal is observed to find an interval wherein the criteria are met, whereupon the gain switching can be implemented. By way of example, a condition of high gain may be present to adjust a spacecraft orientation until the spacecraft comes approximately into the desired orientation. Thereupon, naturally occurring oscillations of relatively small amplitude in the plant states bring the loop error signal into a region of amplitude which meets the foregoing criteria, so that switching can commence.

Also, if the control system includes integral control states, then at the time of a gain switching, each of the relevant integral states are scaled by a factor, up or down, to compensate for a decrease or increase, respectively, in the gain. The scaling factor is equal to the ratio of the gain before switching to the gain after switching. This insures that the component of the output signal of the feedback loop which counteracts the disturbance remains constant during a switching of gain. Waiting until the loop error signal meets the switching criteria reduces transients resulting from noisy state estimates coming from existing high gains in the filter/estimator, or switching to high controller gains when offsets exist, while adjusting the integral control states (when available) at the same time reduces transients resulting from constant disturbance on the system being controlled.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION

Figure 1:
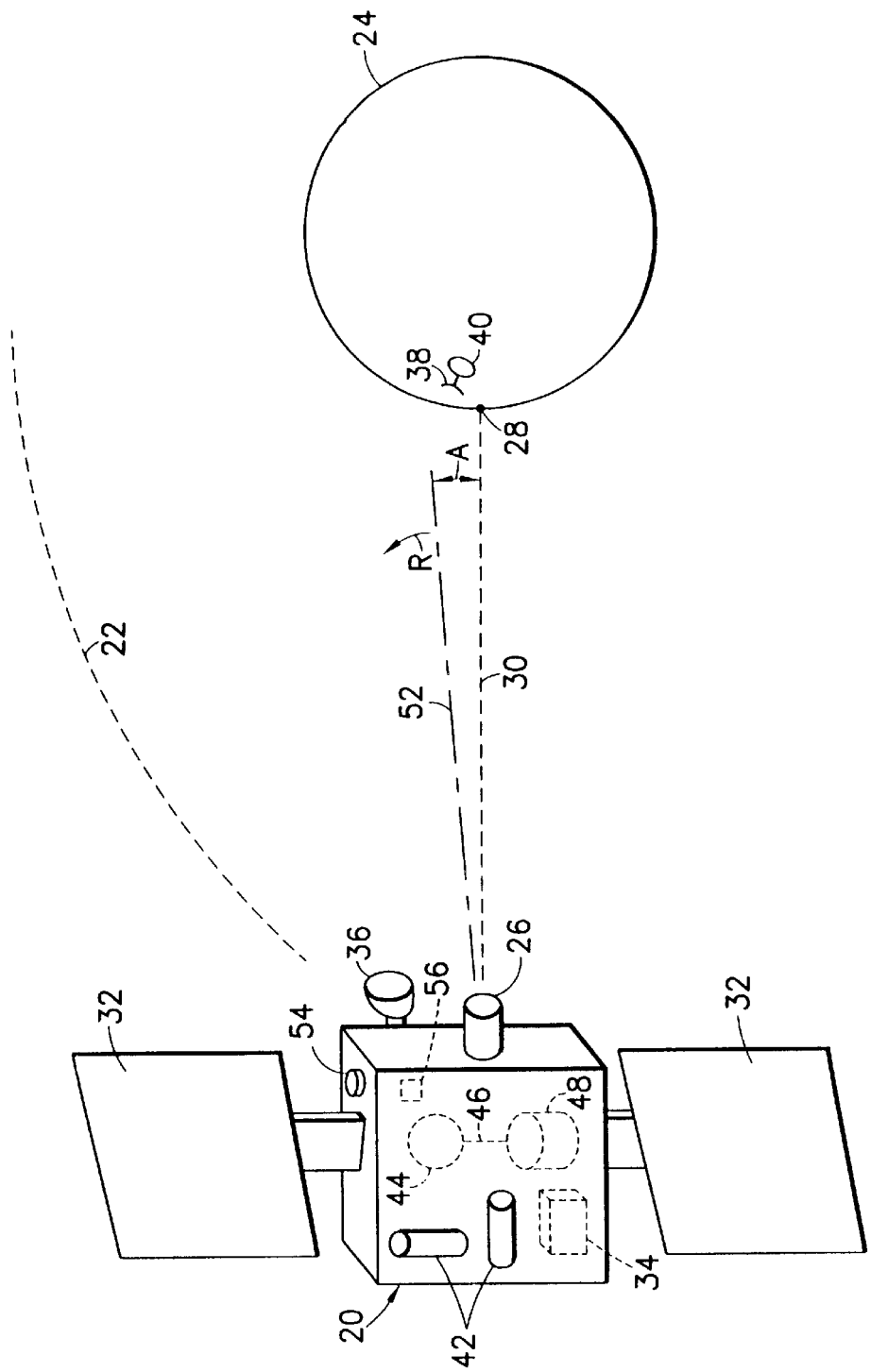
FIG. 1 shows a stylized view of a spacecraft encircling the earth and carrying position control equipment operative in accordance with methodology of the invention.

With reference to FIG. 1, a spacecraft 20 travels along a path 22 about the earth 24. The spacecraft 20 carries an earth sensor 26 which sights a point 28 on the earth's surface via a sight line 30. Also included in the spacecraft 20 are solar panels 32 which receive solar energy for powering electronic equipment 34 which provides functions of communication and control of spacecraft attitude. An antenna 36 on the spacecraft 20 provides for electromagnetic communication with an antenna 38 of a ground station 40 on the earth 24. Adjustment of spacecraft orientation is accomplished by thrusters 42, two of which are shown in FIG. 1, and by reaction wheels 44, one of which is shown in FIG. 1. Each reaction wheel 44 is connected via line 46 to a drive motor 48 which imparts rotation to the reaction wheel 44. The thrusters 42 and the reaction wheels 44 are operated by a control system 50 (shown in FIG. 2) having electronic components included within the equipment 34. A centerline, or boresight 52, of the earth sensor 26 represents actual orientation of the spacecraft 20. By way of example, the spacecraft attitude is offset from a desired orientation as is demonstrated by an angle A between the sight line 30 and the boresight 52. By way of further example, the angular offset A is increasing at a rate R shown vectorially in FIG. 1. In addition to the earth sensor 26, further sensors of attitude may be provided such as a star tracker 54 and a gyro 56.

Figure 2:
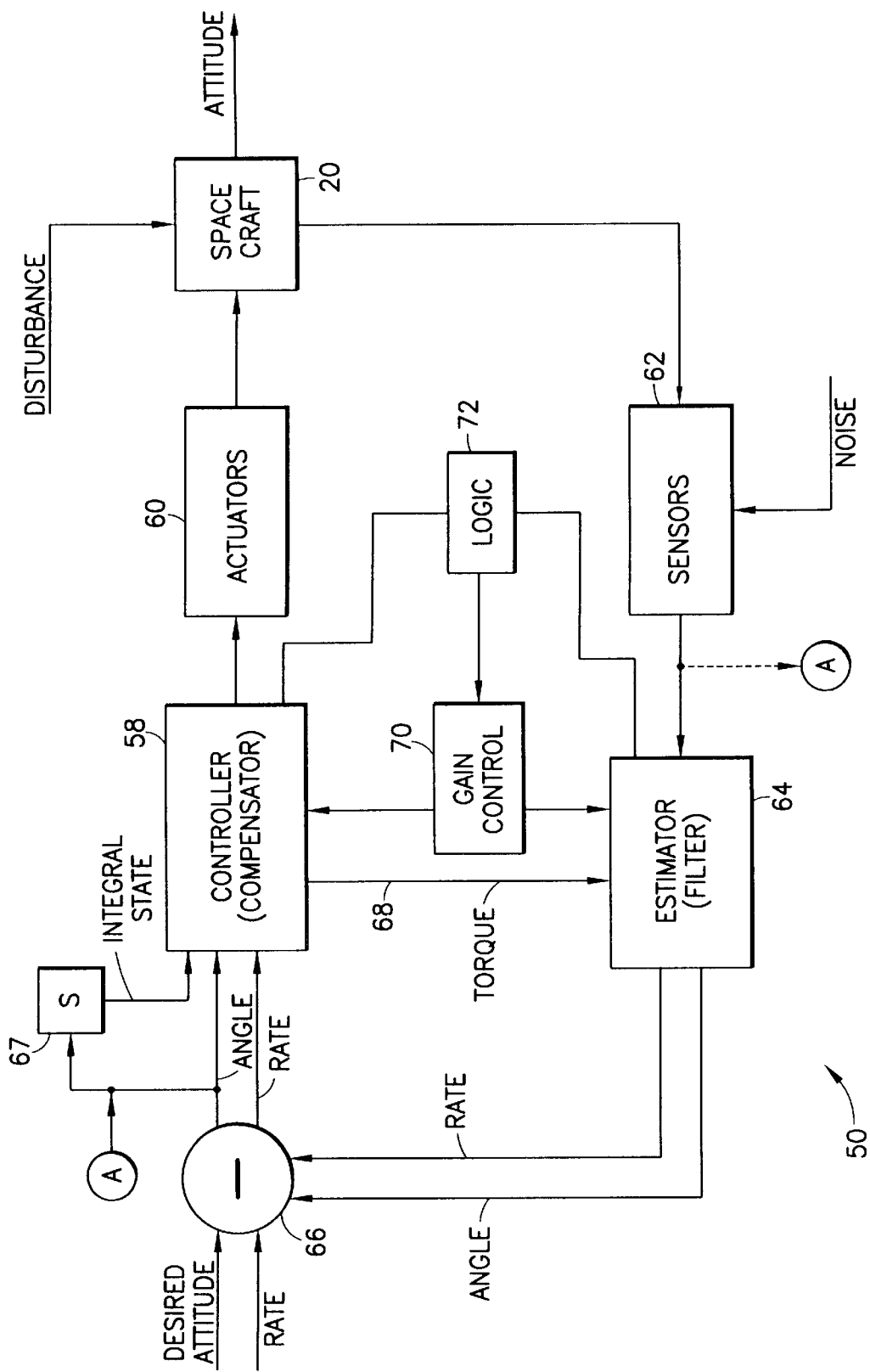
FIG. 2 shows a block diagram of an attitude control system carried by the spacecraft.

As shown in FIG. 2, the control system 50 comprises a controller 58, actuators 60 such as the thrusters 42 and the reaction wheels 44 (FIG. 1), the spacecraft 20 of which the maintenance of attitude constitutes a load to be controlled by the control system 50, sensors 62 such as the earth sensor 26 and the star tracker 54 and the gyro 56 (FIG. 1) of spacecraft attitude, an estimator 64, and a signal combiner 66 which provides the difference between desired input quantities and fed back estimates of spacecraft orientation. The output of the combiner 66 is the loop error signal of the control system 50. The combiner 66 applies the difference between the desired input quantities and the fed back estimates of spacecraft orientation to an input of the controller 56 which provides a compensation function resulting in output command signals for reorienting the spacecraft 20 to minimize the foregoing difference. The desired input quantities include spacecraft attitude and, possibly, angular rate of change in attitude. The command signals are applied by the controller 58 to the actuators 60. The actuators 60 are operative, in responsive to the command signals, to reorient the spacecraft 20. The resultant attitude of the spacecraft is sensed by the sensors 62 which output signals, representing the attitude, to the estimator 64. The description of the control system 50 of FIG. 2 is presented as a single coordinate system, it being understood that, in practice, control is attained in a plurality of dimensions, such as three orientation angles, and three orbital location dimensions, by way of example.

The signals outputted by the sensors 62 may be corrupted by noise present in measurements of orientation angle of the spacecraft 20, and by disturbances applied to the spacecraft 20 which tend to offset its attitude from that commanded by the controller 58. In the operation of the control system 50, the estimator 64 filters signals from the sensor 62 to reduce their noise content. Such filtering also has the effect of reducing dynamic response of the feedback loop of the system 50 for following sudden changes in spacecraft orientation. The response time of the filtering process is inversely related to a gain of the estimator 64, such that a relatively high gain provides for a shorter response time and more noise, while a lower gain provides for a slower response and less noise. For example, a sudden attitude change might be due to an activation of a thruster 42 (FIG. 1) for station keeping, wherein the spacecraft 20 would experience an angular offset in its attitude during a transient behavior as the spacecraft 20 is brought back into position by the actuators 60. The transient offset in angle is relatively small in the case of relatively high gains in the estimator 64 and in the controller 58, but it increases with a reduction in gain.

The disturbance in spacecraft attitude may be caused by viscous friction in the bearings of the reaction wheels 44 or by pressure of solar rays upon the solar panels 32. Both of these disturbance sources introduce a torque which tends to offset the spacecraft attitude from a desired attitude. Such offset is detected by an integrator 67 through integration of angle error from the sensor output signals, and is manifested as a generally constant signal component of the sensor signals, referred to an integral state of the control system 50. Alternatively, angle error may be taken directly from a sensor 62, such as an earth sensor, and applied via terminal A to the integrator 67. In response to a value of the integral state, the controller 58 outputs additional signal for commanding the actuators 60 to develop torque which counteracts the torque of the disturbance.

The estimator 64 also examines the sensor signals to determine angular rate of a change in spacecraft orientation. Alternatively, the sensors may include an angle rate pick-off, not shown, in which case the estimator 64 need not provide this function. To facilitate operation of the estimator 64, thereby to provide a faster response, it is beneficial for the controller 58 to transmit to the estimator 64, via line 68, prior knowledge of a torque, such as the torque in an imminent firing of a thruster, so that the estimator 64 can include this factor in its calculations. Choice of gain values, for providing high or low gains in the controller 58 and in the estimator 64, is provided by a gain control unit 70 under control of a logic unit 72.

Figure 3:
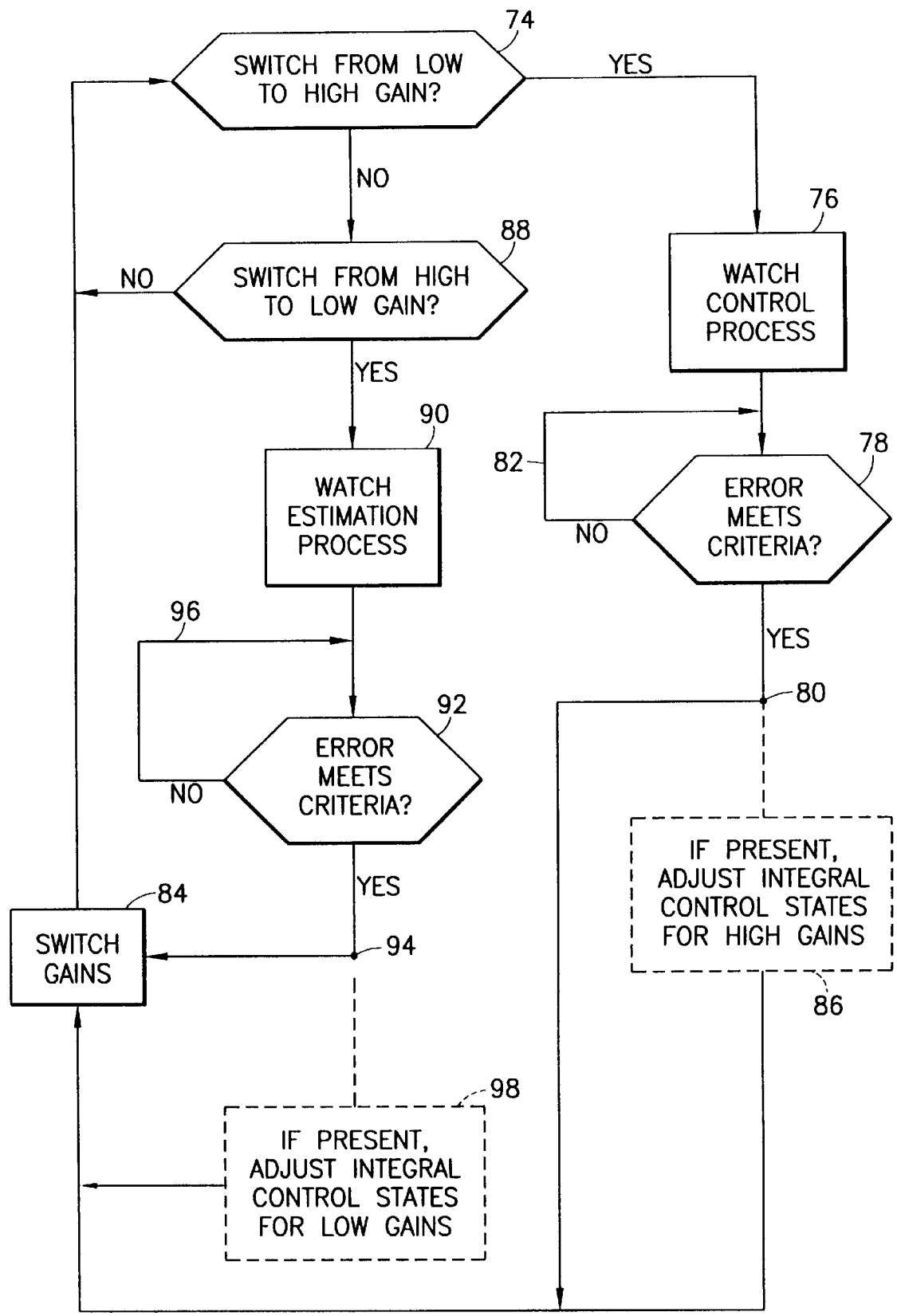
FIG. 3 is a flow chart showing steps in the method of the invention.

In FIG. 3, the procedure of the invention begins at block 74 wherein the logic unit 70 (FIG. 2) determines whether gain is to be increased. This decision is based on angle and rate error signals generated by the combiner 66. If an increase of gain is required, the procedure passes to block 76 wherein there is a procedural step which applies with respect to all loop error signals and to the exclusion of all integral states of the control system 50. The step of block 76 is accomplished during initial setup of the control system 50, and there is determined a criteria for switching from low gain to high gain without significant perturbation of the actuator response. Thereupon, the procedure passes to block 78 wherein all loop error signals, but not the integral states, are examined to determine whether their values are within the bounds of the criteria of block 76. If the criteria is met, operation passes to branch point 80; and if the criteria is not met, operation is recycled back through a waiting loop 82 for further observation of the loop error signals at block 78.

At branch points 80 and 94, the control system designer using this invention determines whether or not to include blocks 86 and 98 in their logic. Blocks 86 and 98 are optional and are used only in the case wherein the control system uses integral states. When block 86 is absent, operation passes directly from block 78 to block 84. When block 86 is present, operation passes from block 78 via block 86 to block 84. When block 86 is present, for each integral control state, there is a selection of the actuator which is most sensitive to the product of its high gain and the integral control state. The most sensitive actuator may be determined during the control system design process, and stored in a memory (not shown) of the logic unit 72. Thereupon, each integral control state is changed by a scaling of its amplitude. Such scaling may be performed outside the combiner 66 so as to output to the controller 58 a reduced value of the integral state. The reduction in the value of the integral control state is by a factor equal to the ratio of the low gain to the high gain. Thereby, after implementation of the gain switching, the product of integral control state by the gain remains the same before and after gain switching. Thereupon, operation passes to block 84 for implementation of the gain switching. After the gain has been switched at block 84, operation reverts to block 74.

If, at block 74, it is determined that there is to be no switch to high gain, then operation passes to block 88 where it is determined whether there is to be a switch from high gain to low gain. If it is determined at block 88 that there is to be no switching to low gain, then operation recycles back to block 74, in a waiting loop whereby the operation cycles between blocks 74 and 88 until a situation arises in the control of spacecraft attitude by the system 50 wherein it would be advantageous to switch gain.

If, at block 88, it is determined that there is to be a switching to low gain, then operation passes to block 90 wherein there is determined a criteria for switching from high gain to low gain without significant perturbation of the actuator response. Thereupon, the procedure passes to block 92 wherein all loop error signals, but not the integral states, are examined to determine whether their values are within the bounds of the criteria of block 90. If the criteria is met, operation passes to branch point 94; and if the criteria is not met, operation is recycled back through a waiting loop 96 for further observation of the measurement states at block 92.

At branch points 80 and 94, as noted above, the control system designer using this invention will determine whether or not to include blocks 86 and 98 in their logic. Blocks 86 and 98 are optional and only used in the case where the control system uses integral states. When block 98 is absent, operation passes directly from block 92 to block 84. When block 98 is present, operation passes from block 92 via block 98 to block 84. When block 98 is present, for each integral control state, there is a selection of the actuator which is most sensitive to the product of its low gain and the integral control state. The most sensitive actuator may be determined during the control system design process, and stored in the memory of the logic unit 72. Thereupon, each integral control state is changed by a scaling of its amplitude. Such scaling may be performed outside the combiner 66 so as to output to the controller 58 an increased value of the integral state. The increase in the value of the integral control state is by a factor equal to the ratio of the high gain to the low gain. Thereby, after implementation of the gain switching, the product of integral control state by the gain remains the same before and after gain switching. Thereupon, operation passes to block 84 for implementation of the gain switching. After the gain has been switched at block 84, operation reverts to block 74.

In view of the forgoing procedure of the invention, the control system 50 can undergo a gain switching for improved performance without the disadvantage of a transient.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method of operating a control system to inhibit formation of transients during a switching of a magnitude a gain within the control system in order to drive a plant in the presence of a possible disturbance function, the control system having a controller, the method comprising:

applying a drive signal to actuation means of the system for driving the plant;

evaluating a difference between desired states of the plant and the estimates of the plant states;

observing said difference to determine an occurrence of a magnitude of the difference which falls within a range of values satisfying a predetermined criteria;

waiting for performing said switching of the magnitude of said gain until the magnitude of said difference falls within said range of values; and switching a value of the gain during said occurrence.

2. A method of operating a control system to inhibit formation of transients during a switching of a magnitude of a gain within the control system in order to drive a plant in the presence of a possible disturbance function, the system having a controller, the method comprising:

applying a drive signal to actuation means of the system for driving the plant;

distinguishing between estimates of the states of the plant and integral control states, wherein the integral control states are generated within the control system to maintain drive signal to the actuation means to counter disturbances on the plant;

evaluating a portion of a controller input signal which portion is exclusive of the integral control states and is comprised of a difference between desired states of the plant and the estimates of the plant states;

observing said difference to determine an occurrence of a magnitude of the difference which falls within a range of values satisfying a predetermined criteria;

waiting for performing said switching of the magnitude of said gain until the magnitude of said difference falls within said range of values;

switching a value of the gain during said occurrence; and concurrently with said switching step, scaling an amplitude of the integral state by a factor inverse to a ratio of switched gain values.

3. A method according to claim 2 wherein said control system has the controller in a forward branch of the system and an estimator in said feedback branch, said distinguishing step being performed at an input to the controller.

4. A method according to claim 3 wherein said step of applying the drive signal to the actuation means is accomplished via said controller.

5. A method according to claim 4 further comprising a step of:

determining that a loop error signal of the control system meets said criteria prior to said gain switching step.

6. A method according to claim 5 wherein said criteria is a criteria of minimal effect on said actuation means and, for accomplishing said scaling step upon an increase of gain from a low gain to a high gain, said criteria-establishing step is accomplished by finding an actuator of a plurality of actuators of said actuation means which is most sensitive to a product of the high gain and the integral control state.

7. A method according to claim 5 wherein, for accomplishing said scaling step upon a decrease of gain from a high gain to a low gain, said criteria-establishing step is accomplished by finding an actuator of a plurality of actuators of said actuation means which is most sensitive to a product of the low gain and the integral control state.

* * * * *